United States Patent
Hiruta et al.

(10) Patent No.: US 9,434,345 B2
(45) Date of Patent: Sep. 6, 2016

(54) AIRBAG AND AIRBAG DEVICE

(71) Applicant: Takata Corporation, Tokyo (JP)

(72) Inventors: Teruhiko Hiruta, Tokyo (JP); Kimihiro Koshikawa, Tokyo (JP)

(73) Assignee: TAKATA CORPORATION, Tokyo (JP)

( * ) Notice: Subject to any disclaimer, the term of this patent is extended or adjusted under 35 U.S.C. 154(b) by 0 days.

(21) Appl. No.: 14/430,102

(22) PCT Filed: Sep. 10, 2013

(86) PCT No.: PCT/JP2013/074397
§ 371 (c)(1),
(2) Date: Mar. 20, 2015

(87) PCT Pub. No.: WO2014/045944
PCT Pub. Date: Mar. 27, 2014

(65) Prior Publication Data
US 2015/0266447 A1    Sep. 24, 2015

(30) Foreign Application Priority Data

Sep. 21, 2012  (JP) .................................. 2012-208902

(51) Int. Cl.
*B60R 21/203*   (2006.01)
*B60R 21/2338*  (2011.01)
*B60R 21/239*   (2006.01)
*B60R 21/26*    (2011.01)

(52) U.S. Cl.
CPC ......... *B60R 21/2338* (2013.01); *B60R 21/203* (2013.01); *B60R 21/239* (2013.01); *B60R 21/26* (2013.01); *B60R 2021/2395* (2013.01); *B60R 2021/23382* (2013.01)

(58) Field of Classification Search
CPC . B60R 21/2338; B60R 21/26; B60R 21/203; B60R 21/239; B60R 2021/2395; B60R 2021/23382
See application file for complete search history.

(56) References Cited

U.S. PATENT DOCUMENTS 7,726,685 B2    6/2010  Abe et al.
7,976,063 B2 *  7/2011  Abe ...................... B60R 21/231
                                                280/743.1

(Continued)

FOREIGN PATENT DOCUMENTS

JP    08-011657 A    1/1996
JP    09-142239 A    6/1997

(Continued)

OTHER PUBLICATIONS

International Search Report dated Dec. 17, 2013 issued in PCT/JP2013/074397.

*Primary Examiner* — Drew Brown
(74) *Attorney, Agent, or Firm* — Foley & Lardner LLP (57) ABSTRACT

An airbag comprises an airbag main body formed into a bag by a front panel and a rear panel, a vent hole formed on the rear panel, a vent cover that is attached to an outer surface of the rear panel and opens and closes the vent hole, a tether provided on the vent cover, a vent patch attached to an inner surface of the rear panel, and a tether cover attached to the inner surface of the rear panel, overlapping the vent patch, wherein: the tether is pulled from a slit formed near the vent hole of the rear panel into the interior of the airbag main body and then inserted through an area between the vent patch and the tether cover.

12 Claims, 9 Drawing Sheets

(56) References Cited

U.S. PATENT DOCUMENTS

| | | | |
|---|---|---|---|
| 8,070,183 B2* | 12/2011 | Kumagai | B60R 21/2338 280/732 |
| 8,267,425 B2* | 9/2012 | Chida | B60R 21/239 280/731 |
| 8,308,191 B2* | 11/2012 | Hiruta | B60R 21/239 280/736 |
| 8,322,748 B2 | 12/2012 | Abe et al. | |
| 8,353,532 B2 | 1/2013 | Abe et al. | |
| 8,419,055 B2* | 4/2013 | Chida | B60R 21/239 280/731 |
| 2005/0225065 A1 | 10/2005 | Fujll | |
| 2007/0045997 A1* | 3/2007 | Abe | B60R 21/231 280/729 |
| 2011/0140400 A1 | 6/2011 | Chida et al. | |

FOREIGN PATENT DOCUMENTS

| | | |
|---|---|---|
| JP | 2001-277991 | 10/2001 |
| JP | 2005-297715 A | 10/2005 |
| JP | 2008-179337 | 8/2008 |
| JP | 2008-308139 | 12/2008 |
| JP | 2009-143374 | 7/2009 |
| JP | 2010-070016 | 4/2010 |
| WO | WO-2008/136336 | 11/2008 |

* cited by examiner

AIRBAG AND AIRBAG DEVICE

BACKGROUND OF THE INVENTION

1. Field of the Invention

The present invention relates to an airbag for restraining an occupant in the event of collision of the vehicle or the like, and an airbag device that uses the same.

2. Description of the Related Art

There have heretofore been known airbag devices whereby an inflator activates in the event of an emergency, such as collision or rollover of the vehicle, and an airbag formed into a bag inflates and deploys from a folded state by pressurized gas jetted from this inflator, restraining the occupant.

The airbag used in the airbag device comprises an airbag main body formed into a bag so as to comprise at least a first panel and a second panel in the inflated and deployed state, and a vent hole formed on the second panel. When an occupant contacts the inflated and deployed airbag main body, the pressurized gas is made to discharge from the interior of the airbag main body via this vent hole. With this arrangement, it is possible to smoothly receive and hold the occupant by the airbag main body.

In recent years, there have been proposed airbags configured so that the vent hole is in a closed or slightly open position until the internal pressure of the airbag main body reaches a predetermined value or higher, and then is in an open or fully open position when the internal pressure of the airbag reaches the predetermined value or higher and an occupant contacts the airbag (refer to WO 2008/136336 and JP, A, 2008-308139, for example).

SUMMARY OF THE INVENTION

Problems to be Solved by the Invention

In the art disclosed in WO 2008/136336, an opening/closing member provided on the outside of the vent hole is opened and closed by a tether that passes through the airbag interior when the airbag inflates and deploys. Accordingly, the operational behavior of the tether when the vent hole is opened and closed is easily affected by the pressurized gas, making it difficult to smoothly control the closed position of the vent hole with high accuracy. As a result, to ensure the internal pressure of the airbag main body with high accuracy, complex setups that decrease the capacity of the airbag main body, increase the jetting ability of the pressurized gas jetted from the inflator, and the like are necessary.

In the art disclosed in JP, A, 2008-308139, a dedicated opening/closing device for adjusting the open position of the vent hole is required. This results in an increase in the size of the airbag device in order to secure space for attaching the opening/closing device and, furthermore, an increase in the cost of the airbag device.

It is therefore an object of the present invention to provide an airbag and an airbag device capable of smoothly controlling the closed position of the vent hole with high accuracy using a relatively simple and low cost structure without complex setup.

Means for Solving the Problems

In order to achieve the above-described object, according to the first invention, there is provided an airbag comprising an airbag main body formed into a bag so as to comprise at least a first panel on a side facing an occupant and a second panel on a side not facing the occupant in an inflated and deployed state, at least one vent hole formed on the second panel, at least one vent cover that is attached to an outer surface of the second panel and opens and closes the vent hole by a cover part, at least one first slit formed near the vent hole in the second panel, at least one tether disposed so that one side of the tether is connected to the cover part and the other side of the tether is pulled from an exterior into an interior of the airbag main body via the first slit, provided on the vent cover, and a tether cover attached to an inner surface side of the second panel, wherein: at least a portion of the other side of the tether pulled into the interior is pulled through an area between the second panel and the tether cover.

According to the airbag of the first invention, the airbag main body is formed into a bag so as to comprise at least a first panel and a second panel in an inflated and deployed state, a vent hole is formed on the second panel, and a vent cover that opens and closes the vent hole is attached to an outer surface of the second panel.

Hence, when the inflator activates in the event of an emergency such as vehicle collision or rollover, the airbag formed into a bag inflates and deploys from a folded state into a bag shape by the pressurized gas jetted from this inflator, and an occupant contacts the inflated and deployed airbag main body, the airbag main body can receive and hold (restrain) the occupant.

Further, according to the airbag of the first invention, it is possible to adjust the open position of the vent hole from an open state to a closed state by the vent cover, from the initial stage of inflation and deployment of the airbag main body to inflation and deployment completion. Then, with the airbag main body completely inflated and deployed, it is possible to set the vent hole to a closed state by the vent cover and maintain the internal pressure of the airbag main body. At this time, the tether of the vent cover is pulled into the interior of the airbag main body, and then a least a portion thereof is pulled through the area between the second panel and tether cover. In this manner, at least a portion of the other side of the tether is covered by the tether cover in the interior of the airbag main body, making it possible to make the tether of the vent cover less susceptible to the effects of the pressurized gas and interference with other components when the airbag main body inflates and deploys, pulling out the tether. As a result, the vent cover can smoothly control the closed position of the vent hole with high accuracy using a relatively simple and low cost structure, without complex setup of the pull-out adjustment by the tether only.

According to the second invention, in the first invention, the airbag further comprises a third panel attached to an inner surface of the second panel between the second panel and the tether cover, wherein at least one second slit for pulling the other side of the tether from an exterior into an interior of the airbag main body is formed near an end of the third panel, in agreement with the first slit, and at least a portion of the other side of the tether pulled into the interior is pulled through an area between the third panel and the tether cover.

According to the airbag of the second invention, a third panel is positioned between the second panel and tether cover, and attached to the inner surface of the second panel. A second slit is formed on the third panel, in a position that agrees with the first slit of the second panel. Accordingly, with the other side of the tether passed through the first slit and the second slit, at least a portion thereof can be pulled through the area between the third panel and the tether cover.

Thus, according to the airbag of the second invention, at least a portion of the other side of the tether is covered by the tether cover in the interior of the airbag main body, making it possible to make the tether of the vent cover less susceptible to the effects of the pressurized gas and interference with other components when the airbag main body inflates and deploys, pulling out the tether. As a result, the closed position of the vent hole can be smoothly controlled with high accuracy using a relatively simple and low cost structure, without complex setup.

According to the third invention, in the airbag according to the first invention, a third slit is formed in the center of the tether cover, and the tether is passed through the first slit, then run through the area between the second panel and the tether cover, and subsequently pulled from the third slit into the airbag main body. Further, according to the fourth invention, in the airbag according to the second invention, a third slit is formed in the center of the tether cover, and the tether is passed through the first slit and the second slit, then run through the area between the third panel and the tether cover, and subsequently pulled from the third slit into the airbag main body.

According to the airbag of the third and fourth invention, if there is an area on the other side of the tether that extends in a direction that crosses the jetting direction of the pressurized gas near the inflator, for example, the area is covered by the tether cover in the interior of the airbag main body, making it possible to make the tether of the vent cover less susceptible to the effects of the pressurized gas and interference with other components when the airbag main body inflates and deploys, pulling out the tether. As a result, the closed position of the vent hole can be smoothly controlled with high accuracy using a relatively simple and low cost structure, without complex setup.

According to the fifth invention, in the airbag according to the third or the fourth invention, the first slit or the second slit is covered by the tether cover. With this arrangement, it is possible to block the first slit or the second slit from the inside, and suppress the pulling of the cloth near the first slit or second slit.

According to the sixth invention, in the airbag according to the third invention, the vent hole is formed as a pair near the center positioned on an inside of a steering wheel rim when the airbag main body is inflated and deployed, sandwiching an inflator attaching part formed in the center of the second panel, and the vent cover and the tether are provided as a pair so as to be symmetrical with respect to the pair of vent holes. With this arrangement, even if the airbag main body starts to inflate and deploy when an occupant (driver) is in an approaching posture, it is possible to expose the vent hole early from the folded state and easily vent the gas from the initial stages.

According to the seventh invention, in the airbag according to the sixth invention, the pair of vent holes is formed in a position symmetrical in a radial direction with the inflator attaching part as the center. Further, according to the eighth invention, in the airbag according to the seventh invention, the pair of vent holes is disposed in a space further on the inside than the steering wheel rim, in a position that avoids a steering spoke that radially extends from near the center of the steering wheel toward the steering wheel rim, and in a position that avoids interference between an opened airbag lid formed on the steering wheel for inflating and deploying the airbag main body and the vent holes.

According to the ninth invention, in the airbag according to the sixth invention, both ends of the tethers are joined together. With this arrangement, it is possible to easily synchronize the opening and closing of the pair of vent covers and make the open positions (sealing positions) uniform.

According to the tenth invention, in the airbag according to the ninth invention, one end of a strip-shaped inflation control member is joined to an inner surface of the first panel, and both ends of the tethers are joined with the other end of the inflation control member. With this arrangement, a pulling action occurs on the tether when the airbag main body inflates and deploys, making it possible to press the vent cover in the closing direction of the vent hole.

According to the 11th invention, in the airbag according to the tenth invention, the one end of the inflation control member is joined at the center of the first panel. With this arrangement, it is possible to position the inflation control member and the slit of the tether cover in the center (0 o'clock direction), and more easily make the open positions of the pair of vent holes uniform.

According to the 12th invention, there is provided an airbag device comprising an airbag in the first invention, and an inflator that supplies a pressurized gas to the airbag.

Advantages of the Invention

According to the airbag and airbag device of the present invention, even with an inexpensive and simple configuration, it is possible to make the tether of the vent cover less susceptible to the effects of the pressurized gas and interference with other components when the airbag main body inflates and deploys, pulling out the tether.

BRIEF DESCRIPTION OF THE DRAWINGS

FIG. 6A is a front view of the vent cover.

FIG. 8A is a front view of the vent cover.

FIG. 9A is a cross-sectional view of the main parts in a state before the airbag main body inflates and deploys.

DETAILED DESCRIPTION OF THE PREFERRED EMBODIMENTS

Next, the airbag and airbag device related to an embodiment of the present invention will be described with reference to accompanying drawings.

Figure 1:
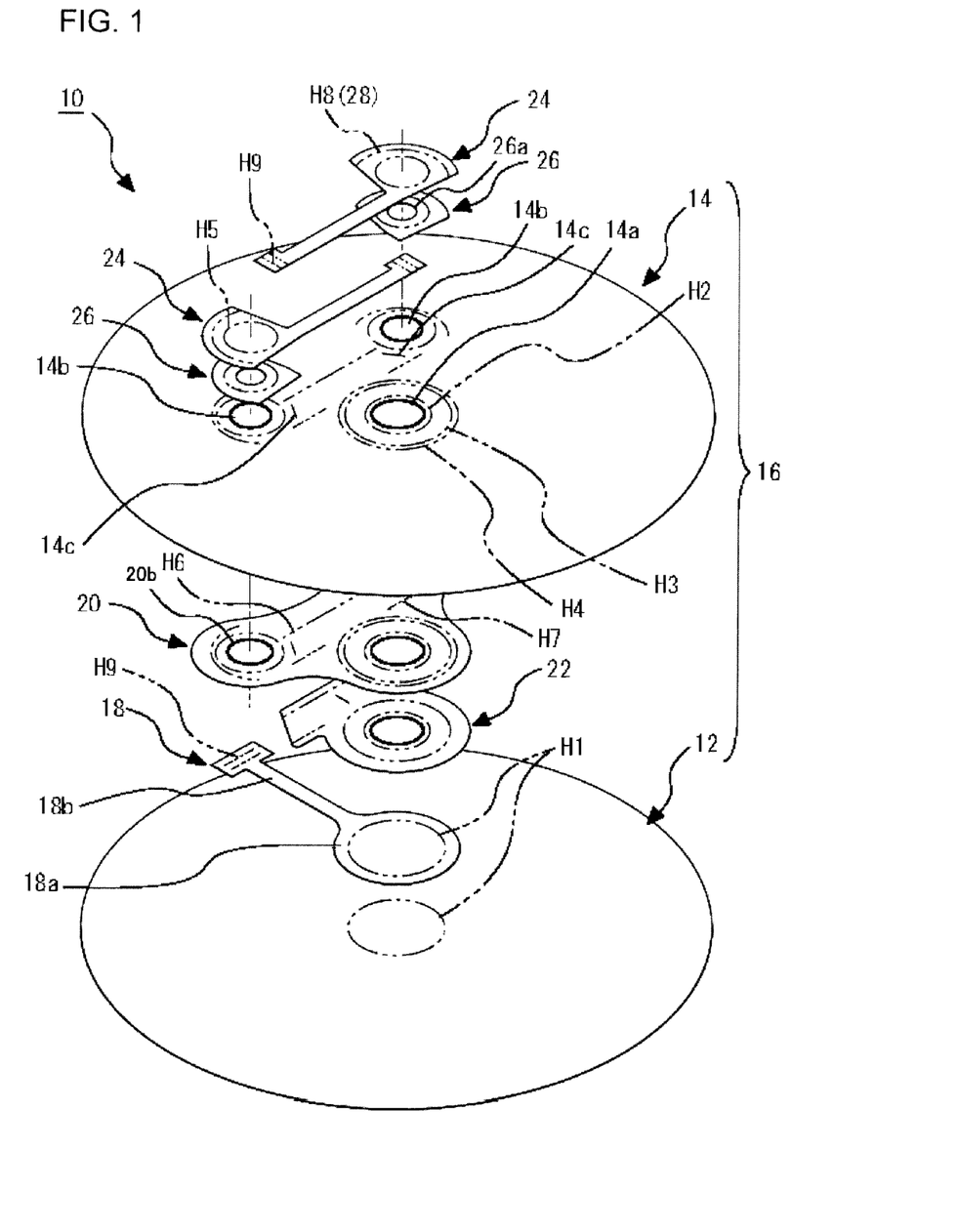
FIG. 1 is an exploded perspective view of an airbag related to an embodiment of the present invention.
Figure 2:
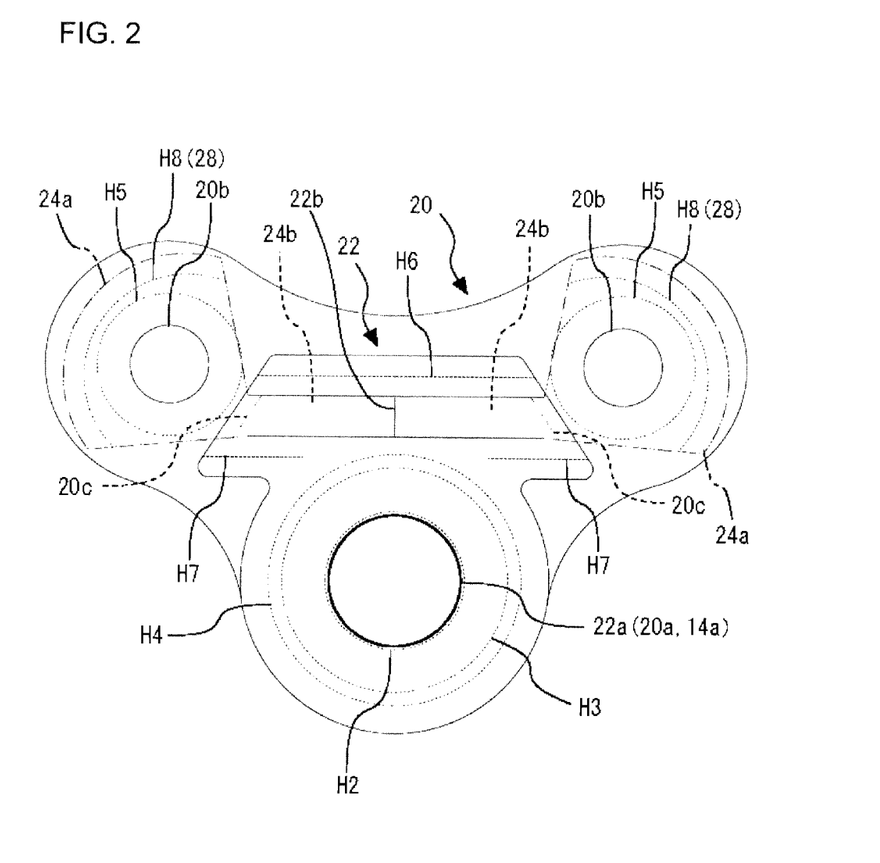
FIG. 2 is a front view of the assembled state of the main parts, showing an airbag related to an embodiment of the present invention.
Figure 3:
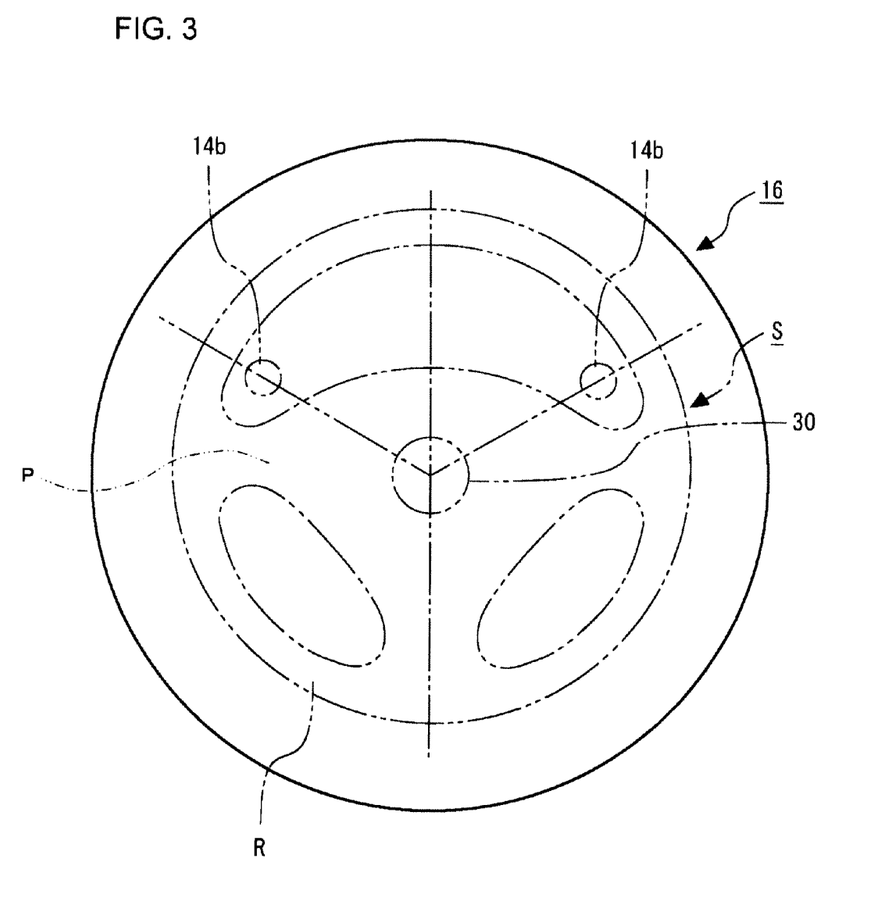
FIG. 3 is an explanatory view of the relative positional relationship between the steering wheel and vent holes, showing an airbag related to an embodiment of the present invention.
Figure 4:
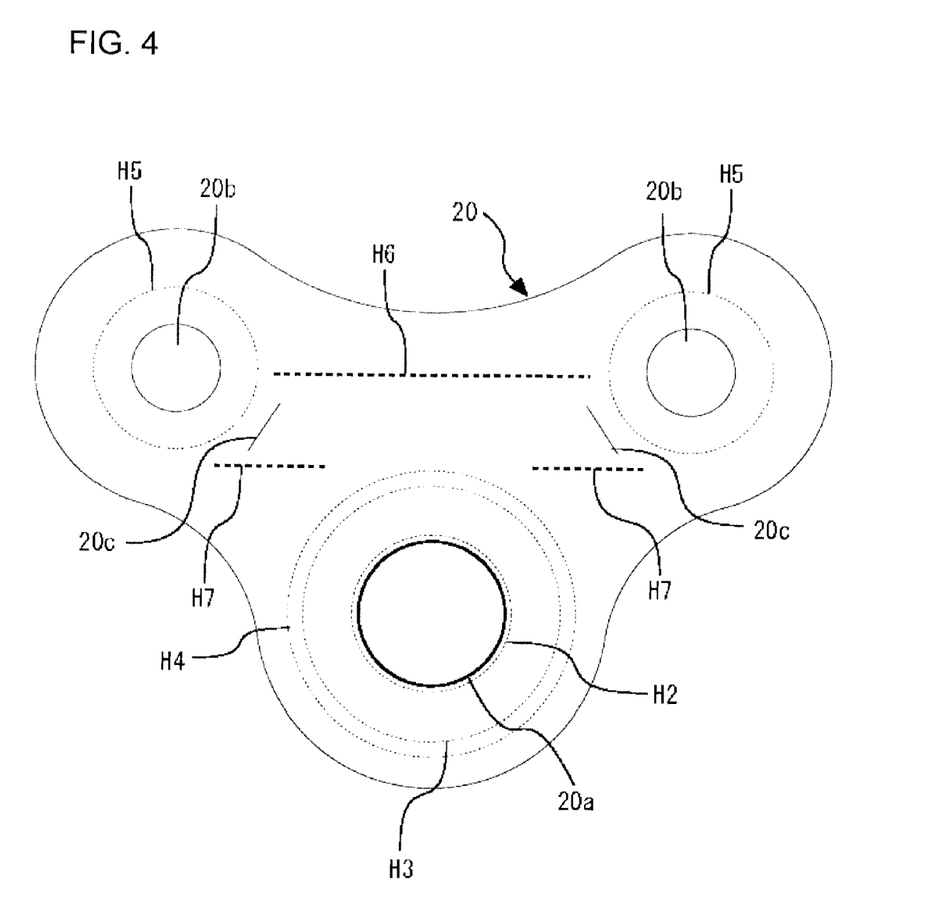
FIG. 4 is a front view of the vent patch (third panel), showing an airbag related to an embodiment of the present invention.
Figure 5:
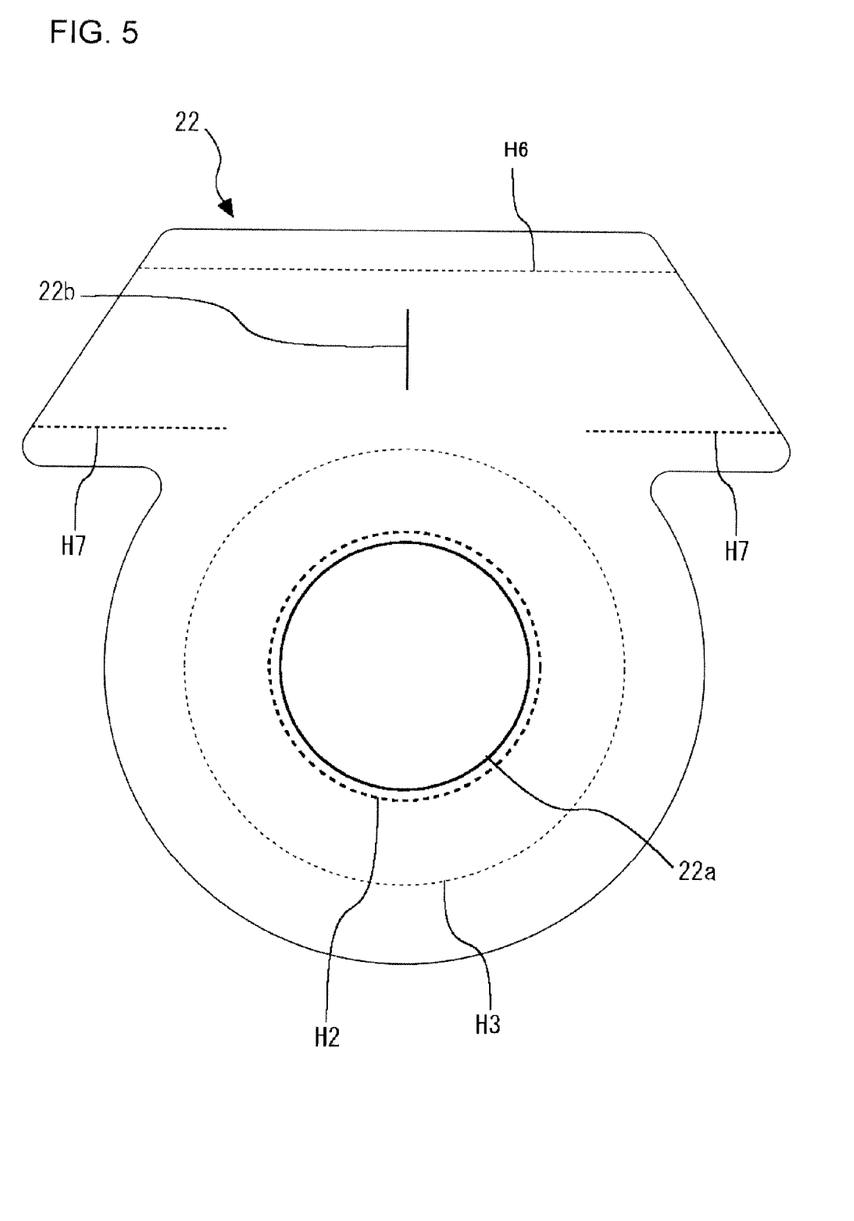
FIG. 5 is a front view of the tether cover, showing an airbag related to an embodiment of the present invention.
Figure 6A:
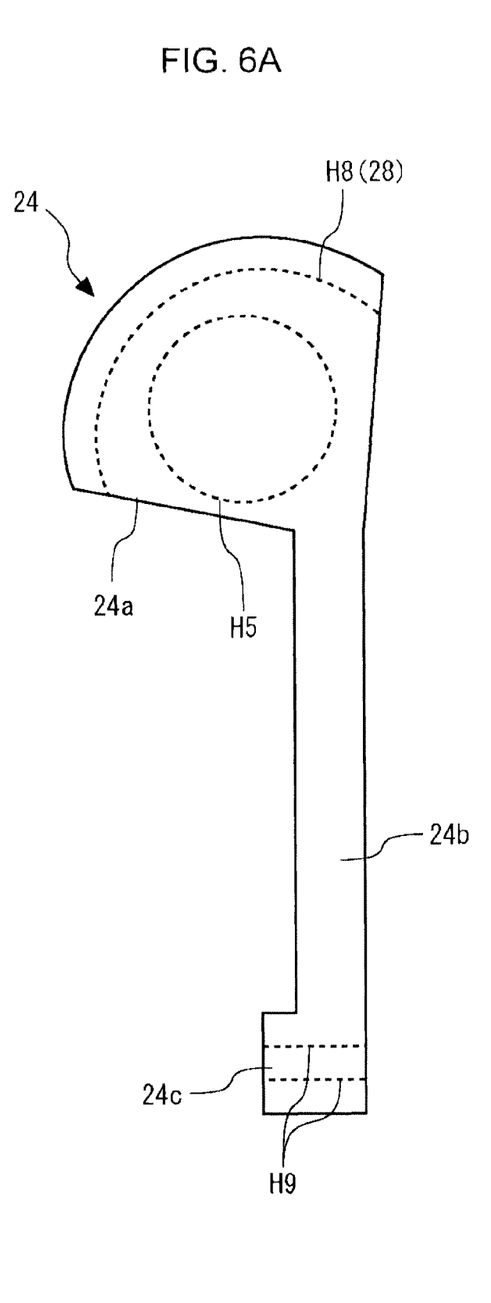
Figure 6B:
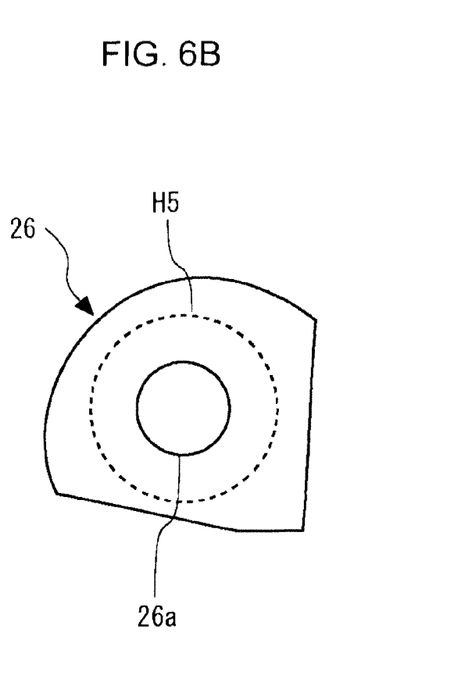
FIG. 6B is a front view of the patch member, showing an airbag related to an embodiment of the present invention.
Figure 7:
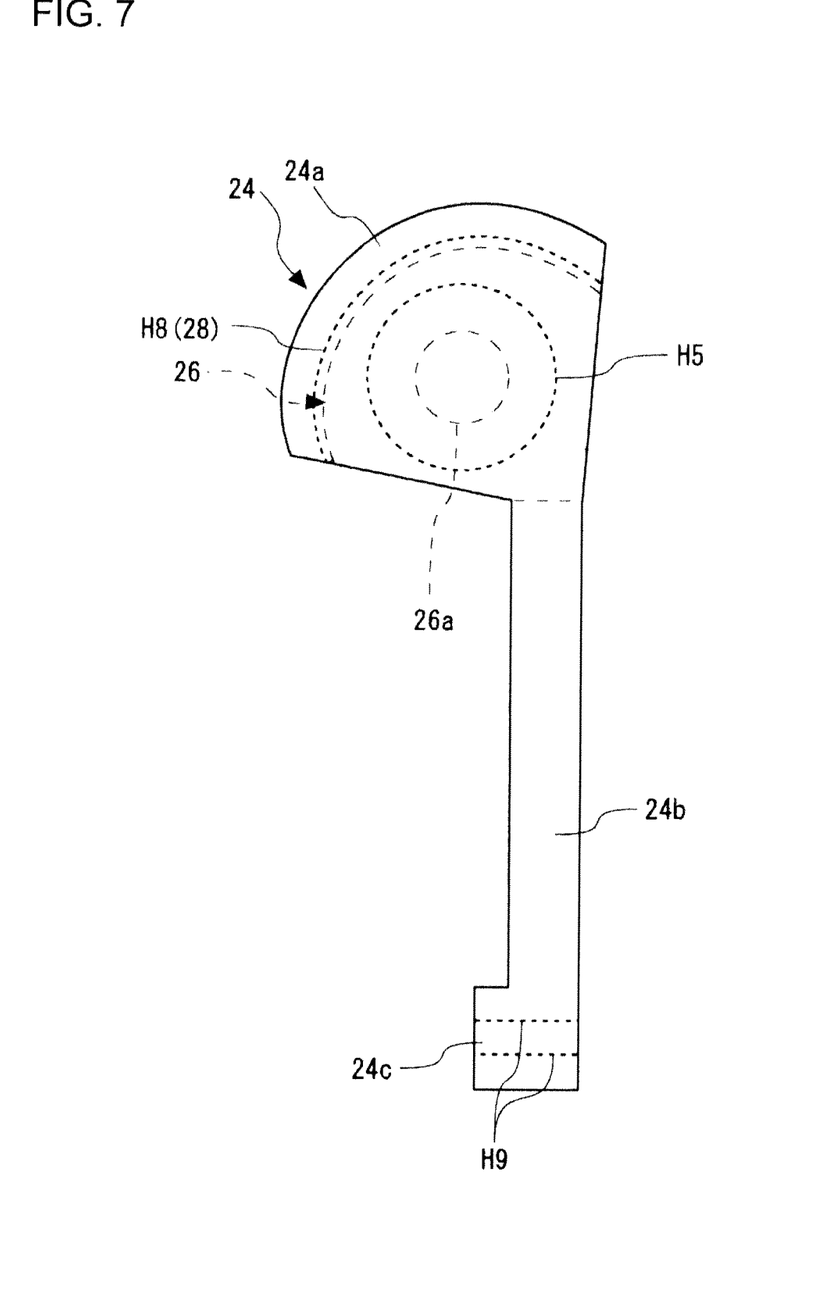
FIG. 7 is a front view of the vent cover with the patch member attached, showing an airbag related to an embodiment of the present invention.
Figure 8A:
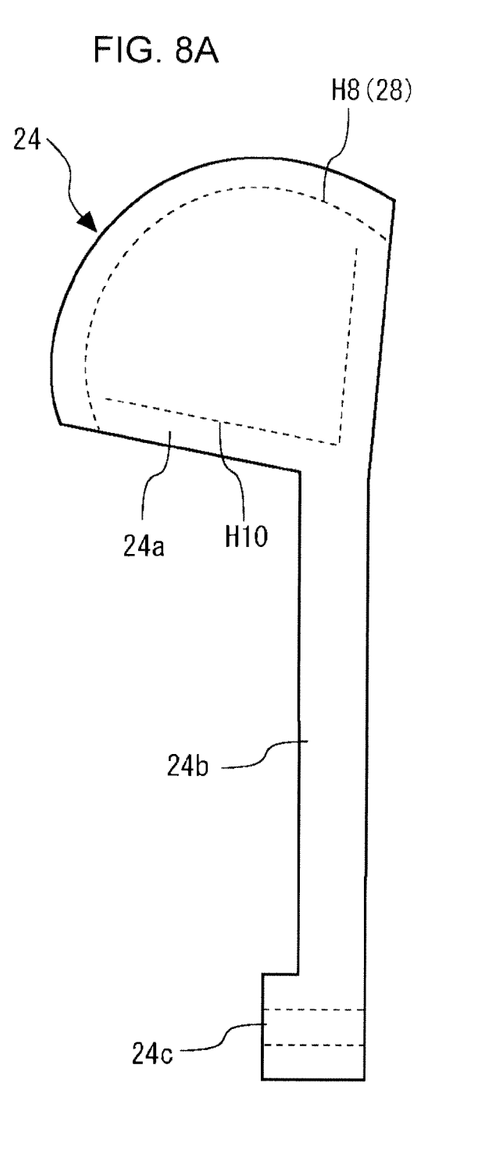
Figure 8B:
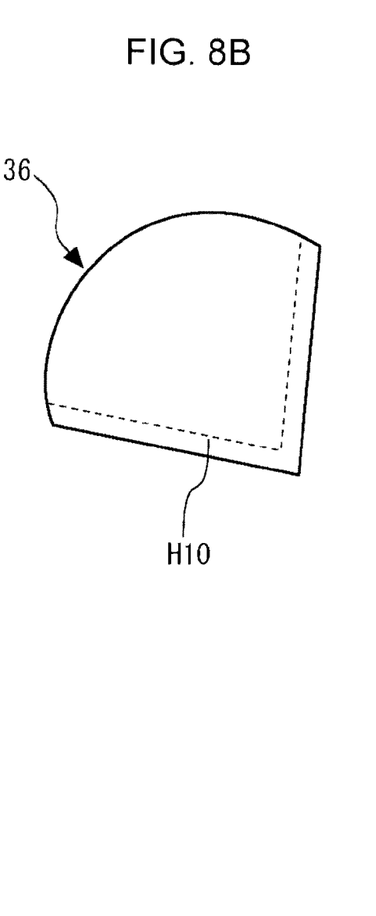
FIG. 8B is a front view of the patch member, showing an airbag in a modification related to an embodiment of the present invention.
Figure 9A:
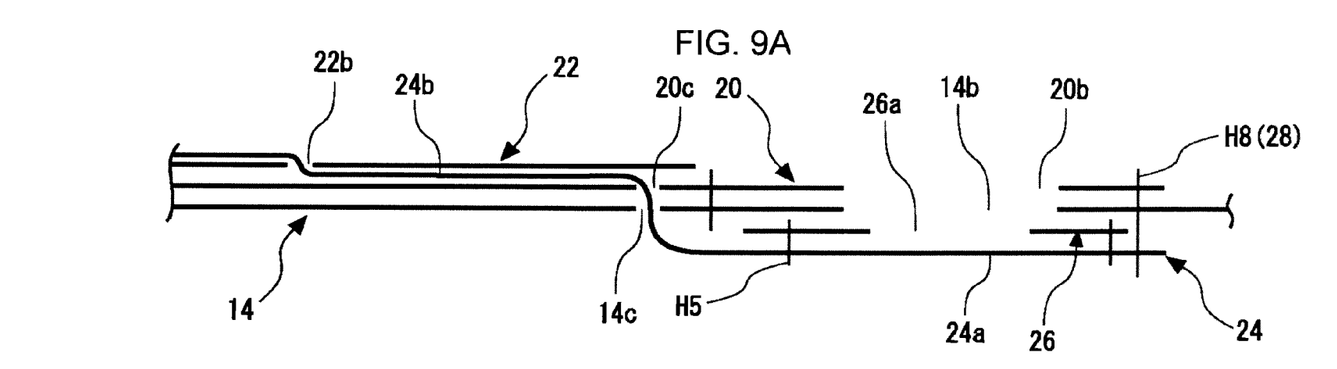
Figure 9B:
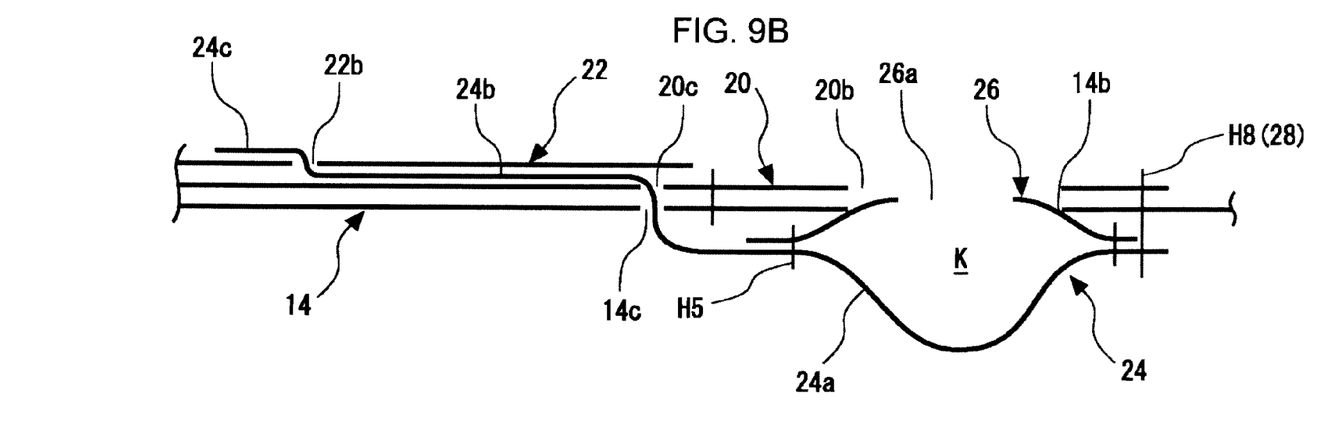
FIG. 9B is a cross-sectional view of the main parts in a state before the airbag main body inflates and deploys, showing an airbag related to an embodiment of the present invention.

FIG. 1 is an exploded perspective view of an airbag related to an embodiment of the present invention; FIG. 2 is a front view of the assembled state of the main parts, showing an airbag related to an embodiment of the present invention; FIG. 3 is an explanatory view of the relative positional relationship between the steering wheel and vent holes, showing an airbag related to an embodiment of the present invention; FIG. 4 is a front view of the vent patch (third panel), showing an airbag related to an embodiment of the present invention; FIG. 5 is a front view of the tether cover, showing an airbag related to an embodiment of the present invention; FIG. 6A is a front view of the vent cover and FIG. 6B is a front view of the patch member, showing an airbag related to an embodiment of the present invention; FIG. 7 is a front view of the vent cover with the patch member attached, showing an airbag related to an embodiment of the present invention; FIG. 8A is a front view of the vent cover and FIG. 8B is a front view of the patch member, showing an airbag in a modification related to an embodiment of the present invention; and FIG. 9A is a cross-sectional view of the main parts in a state before the airbag main body inflates and deploys, and FIG. 9B is a cross-sectional view of the main parts in a state before the airbag main body inflates and deploys, showing an airbag related to an embodiment of the present invention.

In FIG. 1 and FIG. 2, an airbag 10 comprises a substantially perfectly circular front panel 12 serving as a first panel positioned on a side facing an occupant, and a rear panel 14 serving as a second panel positioned on a side not facing an occupant, having substantially the same diameter as the front panel 12, and constitutes a bag-shaped airbag main body 16 with the peripheral edges thereof joined by stitching or the like. Note that, with the airbag main body 16 inflated and deployed, the front panel 12 serving as the first panel constitutes the surface that faces (lines up with) the occupant, that is, the front surface that the occupant actually contacts (using the occupant as reference). Further, the rear panel 14 constitutes a surface, which excludes the front panel 12, of the three-dimensional shape of the airbag main body 16 when inflated and deployed into a bag shape and, according to the three-dimensional shape, includes the side surfaces such as the side panels and the like.

An inflation control member 18 is disposed on the front panel 12, near the center. This inflation control member 18 integrally comprises a joining part 18a that is joined by stitching H1 (shown by the double-dashed chain line in FIG. 1 only) to the center of the front panel 12, and a strip-shaped regulating part 18b that extends from the joining part 18a.

A substantially triangular shaped vent patch 20 that serves as a third panel and a tether cover 22 are disposed on the inner surface of the rear panel 14. Further, vent covers 24 and patch members 26 are disposed on the outside of the rear panel 14.

An inflator insertion hole 14a is formed near the center of the rear panel 14. A pair of vent holes 14b is formed on the rear panel 14, on the vehicle body upward (frontward) side from the center of the rear panel 14, in the state attached to the vehicle body (the state attached to the steering wheel). The vent holes 14b are formed so that each comprises an opening center in a radial direction from the center of the rear panel 14, and so that, for example, they are symmetrical in the 2 o'clock and 10 o'clock directions, using the short hand of the clock as reference, with respect to a center line (the 0 o'clock direction) of a steering wheel S that extends in the vehicle body front-rear direction, as shown in FIG. 3. Note that the vent holes 14b are formed in the center of the rear panel 14, that is, in positions near an inflator 30 of an inflator device, and are set so that venting is possible from the initial stage of deployment. At this time, the pair of vent holes 14b is disposed in a space that avoids a spoke P that extends from near the center toward a wheel rim R of the steering wheel S, further on the inside than the wheel rim R. Further, the vent holes 14b are disposed in positions capable of avoiding interference (overlap) between an opened airbag lid (not shown) formed on the steering wheel S and the vent holes 14b. A pair of slits 14c is formed on the rear panel 14, in positions near the respective vent holes 14b.

The vent patch 20 is formed from cloth of the same material as the front panel 12 and the rear panel 14, in a substantially triangular shape with each corner area made into an arc shape, as shown in FIG. 4. A second inflator insertion hole 20a that agrees with the aforementioned inflator insertion hole 14a, a pair of vent holes 20b that agrees with the vent holes 14b, and a pair of slits 20c that agrees with the respective slits 14c are formed on the vent patch 20. The vent patch 20 is joined to the rear panel 14 by stitching H2, H3, H4 in an annular (perfectly circular) manner so as to surround the second inflator insertion hole 20a, for example. Further, the vent patch 20 is joined to the rear panel 14 by stitching H5 in an annular (perfectly circular) manner so as to surround the vent hole 20b. Furthermore, the vent patch 20 is extended so as to straddle the pair of slits 20c, and is joined to the rear panel 14 by parallel stitching H6, H7, sandwiching the slits 20c.

The tether cover 22 is formed from cloth of the same material as the front panel 12 and the rear panel 14, as shown in FIG. 5, forming a third inflator insertion hole 22a that agrees with the inflator insertion hole 14a, and a slit 22b positioned on the center line (0 o'clock direction) that extends in the vehicle body front-rear direction. Note that the tether cover 22 is atypically formed so as to avoid the vent holes 20b, and the slit 22b is formed so as to be positioned between the pair of slits 20c. The tether cover 22 is integrally joined to the rear panel 14 with the vent patch 20 (by the stitching H2, H3, H6, H7). The tether cover 22 covers the slits 20c of the vent patch 20 on both ends thereof, improving the seal integrity by blocking the communicated state with the exterior via the slits 14c of the rear panel 14.

The vent covers 24, as shown in FIG. 6A, each comprise a fan-shaped cover 24a (cover part), a strip-shaped tether 24b that extends from the cover 24a, and a joining piece 24c that is wider than the tether 24b and positioned at the tip end of the tether 24b. Note that the vent covers 24 are individually correspondingly disposed on the respective vent holes 14b. At this time, the vent covers 24 used are identical in shape, size, and the like (apparently with the front and rear reversed in the attached state) and, as shown in FIG. 1, are symmetrically disposed with respect to each other. According to this embodiment, the pair of vent holes 14b is symmetrically disposed with respect to the center line (0 o'clock direction). Accordingly, the pair of vent covers 24 is also symmetrically disposed with respect to the center line of the rear panel 14 (the airbag main body 16). The arc-shaped peripheral edges of the covers 24a of the vent covers 24 are each joined to the rear panel 14 by stitching H8, and the vent covers 24 each constitute a hinge part 28 by the stitching H8. Hence, the hinge parts 28 are each formed on the introduction direction (jetting direction) downstream side of the pressurized gas jetted from the inflator 30 disposed in the center of the rear panel 14, that is, on the outer circumference side of the rear panel 14. Accordingly, the arc centers of the hinge parts 28 are each preferably positioned on the extending line of the line that connects the center of the rear panel 14 and the center of the vent hole 14b. The tethers 24b are each inserted into the slit 14c and the slit 20c and then pulled out from the slit 22b via the area between the vent patch 20 and the tether cover 22 (between the stitching H6 and the stitching H7), and subsequently the joining pieces 24c of the respective ends are joined by stitching H9. The length of the tethers 24b is set so as to regulate the open positions of the covers 24a using the slit 22b as reference when the joining pieces 24c thereof are joined. Further, the pair of tethers 24b is joined with the tip end of the regulating part 18b of the inflation control member 18 by the stitching H9, thereby regulating the thickness of the airbag main body 16 when the airbag main body 16 inflates and deploys, in accordance with both lengths. Further, the tether 24b, which is one end of the vent cover 24, passes through the slit 20c and the slit 22b, thereby making the cloth of the slit 20c less susceptible to stretching by the pressurized gas jetted from the inflator 30, reducing gas leakage.

The patch member 26, as shown in FIG. 6B, is formed into a fan shape, and an opening 26a having a smaller diameter than that of the opening of the vent hole 14b is formed in the center thereof. According to this embodiment, as shown in FIG. 7, the patch member 26 is joined to the cover 24a by the stitching H5 so as to surround the opening 26a.

As shown in FIGS. 8A and 8B, the design may be such that a patch member 36 is formed into a fan shape smaller than the cover 24a, only the arc-shaped part of the cover 24a is joined to the rear panel 14, the arc-shaped part of the patch member 36 and the cover 24a are not joined, the two linear sides are joined with the cover 24a by stitching H10, and the arc-shaped part not joined (non-joined part) replaces the opening 26a. Note that the vent cover 24 only differs in the stitched part (joined part) of the cover 24a, and the shape, size, and the like are identical to those shown in FIG. 6A.

In the above described configuration, as shown in FIG. 9A, the covers 24a and the patch members 26 are positioned so as to extend along the rear panel 14 in a stored state with the inflator 30 not activated.

When the inflator 30 activates and the pressurized gas is supplied to the interior of the airbag main body 16, a portion thereof attempts to be released from the vent holes 14b to the exterior. Hence, as the airbag main body 16 inflates, tension is applied to the regulating part 18b and the tethers 24b, thereby producing tensile force and regulating the open positions of the covers 24a. Further, a portion of the pressurized gas is supplied from the openings 26a to the areas between the covers 24a and the patch members 26 and, as shown in FIG. 9B, the covers 24a and the patch members 26 inflate in cooperation, pressing the vent holes 14b while forming a space K for pressurized gas accumulation between the covers 24a and the patch members 26. Accordingly, by the inflation of the covers 24a and the patch members 26 in addition to the regulation of the open positions of the covers 24a by the tensile force of the tethers 24b described above, it is possible to highly maintain the seal integrity of the vent holes 14b.

Further, the other end (the regulating part 18b) of the inflation control member 18 that regulates thickness when the airbag main body 16 inflates and deploys, and both ends (the joining pieces 24c) of the tethers 24b are joined, making it possible to regulate thickness during inflation of the airbag main body 16 by the entire length of the regulating part 18b and the tethers 24b and, with the pulling action produced on the tethers 24b by the inflation and deployment of the airbag main body 16, press the vent covers 24 in the closing direction of the vent holes 14b.

Hence, the tethers 24b are joined with the other end (the regulating part 18b) of the inflation control member 18, thereby receiving the load in the pulling direction along with the inflation and deployment of the airbag main body 16.

Nevertheless, in this embodiment, the other end sides of the tethers 24b are introduced as is between the vent patch 20 and the tether cover 22 from the slits 20c in the interior of the airbag main body 16, making it possible to perform control so that the pulling load (direction) extends along the surface direction of the cloth without forcibly widening the slits 20c and the slits 14c. With this arrangement, it is possible to doubly ensure retention of the pressurized gas.

Moreover, the slits 20c and the slits 14c are covered by a portion of the tether cover 22. Accordingly, even if the slits 20c and the slits 14c are forcibly stretched by the pulling load of the cloth resulting from the pressure load of the pressurized gas and the inflation and deployment of the airbag main body 16, it is possible to block the slits 20c and the slits 14c from the inside of the airbag main body 16. With this arrangement, it is possible to further doubly ensure retention of the pressurized gas. However, even if the slits 20c and the slits 14c are not covered by a portion of the tether cover 22, it is possible to doubly ensure the retention of the pressurized gas by the above described configuration wherein the other end sides of the tethers 24b are introduced between the vent patch 20 and the tether cover 22. Furthermore, since the area between the end of the tether cover 22 and the vent patch 20 is not open (a non-stitched part) in a counter direction with respect to the jetting direction of the pressured gas jetted from the inflator 30, the pressurized gas never enters the area between the tether cover 22 and the vent patch 20 as is.

As described above, according to the airbag device comprising the airbag 10 in this embodiment, the tethers 24b are pulled from the slits 14c formed near the vent holes 14b of the rear panel 14 into the interior of the airbag main body 16, and then pulled through the area between the vent patch 20 and the tether cover 22. The tethers 24b are thus covered by the tether cover 22 in the interior of the airbag main body, making it possible to make the tethers 24b of the vent covers 24 less susceptible to the effects of the pressurized gas and interference with other components when the airbag main body 16 inflates and deploys, pulling out the tethers 24b. As a result, the closed positions of the vent holes 14b can be smoothly controlled with high accuracy using a relatively simple and low cost structure, without complex setup.

Further, in particular, according to this embodiment, the slits 20c (second slits) that agree with the slits 14c (first slits) formed on the rear panel 14 are formed near the ends of the vent patch 20, and the slit 22b (third slit) is formed in the center of the tether cover 22. Then, the tethers 24b are passed through the slits 14c of the rear panel 14 and the slits 20c of the vent patch 20, run through the area between the vent patch 20 and the tether cover 22, and then pulled from the slit 22b of the tether cover 22 into the interior of the airbag main body 16. With this arrangement, even if the tether 24b is near an area where the pressure of the pressurized gas is high, it is possible to suppress the adverse effects of a middle part of the tether 24b being swept away by the pressure, causing the end side to be pulled (pulled in).

Further, in particular, according to this embodiment, the slits 20c of the vent patch 20 are covered by the tether cover 22, making it possible to block the slits 20c and the slits 14c from the inside and suppress the pulling of the cloth near the slits 20c of the vent patch 20.

Further, in particular, according to this embodiment, the vent holes 14b are formed as a pair near the center positioned on the inside of the steering wheel rim R when the airbag main body 16 is inflated and deployed, sandwiching an inflator attaching part (the respective inflator insertion holes 14a, 20a, 22a) formed in the center of the rear panel 14, and the vent covers 24 and the tethers 24b are symmetrically disposed with respect to the pair of vent holes 14b. With this arrangement, even if the airbag main body 16 starts to inflate and deploy when the occupant (driver) is in an approaching posture, for example, it is possible to expose the vent holes 14b early from the folded state and easily vent the gas from the initial stages.

Further, in particular, according to this embodiment, the vent holes 14b are formed in positions symmetrical in the radial direction with the inflator attaching part as the center. In particular, in this example, the vent holes 14b are disposed in a space that avoids the spoke P that extends from near the center toward the wheel rim R of the steering wheel S, further on the inside than the wheel rim R. Further, the vent holes 14b are disposed in positions capable of avoiding interference (overlap) between an opened airbag lid (not shown) formed on the steering wheel S and the vent holes 14b.

Further, in particular, according to this embodiment, both ends of the tethers 24b join together, making it possible to easily synchronize the opening and closing of the pair of vent covers 24 and make the open positions (sealing positions) uniform.

Further, in particular, according to this embodiment, one end (the joining part 18a) of the strip-shaped inflation control member 18 is joined to the inner surface of the front panel 12, and both ends of the tethers 24b are joined with the other end (the regulating part 18b) of the inflation control member 18. With this arrangement, a pulling action occurs on the tethers 24b when the airbag main body 16 inflates and deploys, making it possible to press the vent covers 24 in the closing direction of the vent holes 14b.

Further, in particular, according to this embodiment, one end of the inflation control member 18 is joined at the center of the front panel 12, thereby making it possible to position the inflation control member 18 and the slit 22b of the tether cover 22 in the center (0 o'clock direction) and more easily make the open positions of the pair of vent holes 14b uniform.

What is claimed is:

1. An airbag comprising:
    an airbag main body formed into a bag so as to comprise at least a first panel on a side facing an occupant and a second panel on a side not facing the occupant in an inflated and deployed state;
    at least one vent hole formed on said second panel;
    at least one vent cover that is attached to an outer surface of said second panel and opens and closes said vent hole by a cover part;
    at least one first slit formed near said vent hole in said second panel;
    at least one tether disposed so that one side of the tether is connected to said cover part and the other side of the tether is pulled from an exterior into an interior of said airbag main body via said first slit, provided on said vent cover; and
    a tether cover attached to an inner surface side of said second panel; wherein:
    at least a portion of said other side of said tether pulled into said interior is pulled through an area between said second panel and said tether cover;
    a third panel attached to the an inner surface of said second panel between said second panel and said tether cover; wherein:
    at least one second slit for pulling said other side of said tether from an exterior into an interior of said airbag main body is formed near an end of said third panel, in agreement with said first slit; and
    at least a portion of said other side of said tether pulled into said interior is pulled through an area between said third panel and said tether cover.

2. The airbag according to claim 1, wherein:
    a third slit is formed in the center of said tether cover; and
    said tether is passed through said first slit and said second slit, then run through the area between said third panel and said tether cover, and subsequently pulled from said third slit into said airbag main body.

3. An airbag device comprising:
    an airbag according to claim 1; and
    an inflator that supplies a pressurized gas to said airbag.

4. An airbag comprising:
    an airbag main body formed into a bag so as to comprise at least a first panel on a side facing an occupant and a second panel on a side not facing the occupant in an inflated and deployed state;
    at least one vent hole formed on said second panel;
    at least on vent cover that is attached to an outer surface of said second panel and opens and closes said vent hole by a cover part;
    at least one first slit formed near said vent hole in said second panel;
    at least one tether disposed so that one side of the tether is connected to said cover part and the other side of the tether is pulled from an exterior into an interior of said airbag main body via said first slit, provided on said vent cover; and
    a tether cover attached to an inner surface side of said second panel; wherein:
    at least a portion of said other side of said tether pulled into said interior is pulled through an area between said second panel and said tether cover;
    a third slit is formed in the center of said tether cover; and
    said tether is passed through said first slit, then run through the area between said second panel and said tether cover, and subsequently pulled from said third slit into said airbag main body.

5. The airbag according to claim 4, wherein:
    said first slit or said second slit is covered by said tether cover.

6. The airbag according to claim 4, wherein:
    said vent hole is formed as a pair near the center positioned on an inside of a steering wheel rim when said airbag main body is inflated and deployed, sandwiching an inflator attaching part formed in the center of said second panel; and
    said vent cover and said tether are provided as a pair so as to be symmetrical with respect to said pair of vent holes.

7. The airbag according to claim 6, wherein:
    said pair of vent holes is formed in a position symmetrical in a radial direction with said inflator attaching part as the center.

8. The airbag according to claim 7, wherein:
    said pair of vent holes is disposed in a space further on the inside than said steering wheel rim, in a position that avoids a steering spoke that radially extends from near the center of said steering wheel toward said steering wheel rim, and in a position that avoids interference between an opened airbag lid formed on said steering wheel for inflating and deploying said airbag main body and said vent holes.

9. The airbag according to claim 6, wherein:
both ends of said tethers are joined together.

10. The airbag according to claim 9, wherein:
one end of a strip-shaped inflation control member is joined to an inner surface of said first panel; and
both ends of said tethers are joined with the other end of said inflation control member.

11. The airbag according to claim 10, wherein:
said one end of said inflation control member is joined at the center of said first panel.

12. An airbag device comprising:
an airbag according to claim 4; and
an inflator that supplies a pressurized gas to said airbag.

* * * * *